United States Patent
Mars et al.

(10) Patent No.: US 12,238,091 B1
(45) Date of Patent: Feb. 25, 2025

(54) METHODS AND APPARATUS FOR FACILITATING DISTRIBUTION OF AUTHENTICATED DATA WITH REDUCED HARDWARE REQUIREMENTS

(71) Applicant: OURARING INC., San Francisco, CA (US)

(72) Inventors: Denis Mars, San Francisco, CA (US); Simon Ratner, San Francisco, CA (US)

(73) Assignee: Oura Health Oy, Oulu (FI)

( * ) Notice: Subject to any disclaimer, the term of this patent is extended or adjusted under 35 U.S.C. 154(b) by 210 days.

(21) Appl. No.: 17/704,945

(22) Filed: Mar. 25, 2022

Related U.S. Application Data

(60) Provisional application No. 63/167,502, filed on Mar. 29, 2021.

(51) Int. Cl.
*H04L 9/40* (2022.01)

(52) U.S. Cl.
CPC ........ *H04L 63/0853* (2013.01); *H04L 63/083* (2013.01)

(58) Field of Classification Search
CPC .......... H04L 63/0853; H04L 63/083
See application file for complete search history.

(56) References Cited

U.S. PATENT DOCUMENTS

| | | | |
|---|---|---|---|
| 2014/0282857 A1* | 9/2014 | White | G06F 21/44 726/1 |
| 2015/0363182 A1* | 12/2015 | He | G06F 8/61 717/175 |
| 2018/0173871 A1* | 6/2018 | Toth | H04W 12/126 |
| 2018/0302416 A1* | 10/2018 | Einberg | H04W 12/08 |
| 2019/0034188 A1* | 1/2019 | Pollack | G06F 8/65 |

* cited by examiner

*Primary Examiner* — Sangseok Park
(74) *Attorney, Agent, or Firm* — Holland & Hart LLP

(57) ABSTRACT

An authentication method includes registering in an authentication service associated with an application, a ID of a wearable device, disposing the wearable device proximate to a smart device that does not have the application, to provide the ID and an identifier for the application, wherein the smart device stores a document, receiving in the authentication service from the smart device, a communication including the ID, the identifier, and the document, wherein the smart device receives the application in response to the identifier, determining in the authentication service, whether an authentication service is approved in response to the ID, digitally signing in the authentication service, the document to form a digitally signed document, in response to the document and to determining that the authentication service is approved, outputting with the authentication service, the digitally signed document to the smart device.

20 Claims, 8 Drawing Sheets

METHODS AND APPARATUS FOR FACILITATING DISTRIBUTION OF AUTHENTICATED DATA WITH REDUCED HARDWARE REQUIREMENTS

CROSS-REFERENCE TO RELATED APPLICATION

The present invention is a non-provisional of and claims priority to U.S. Pat. App. No. 63/167,502, filed Mar. 29, 2021. That application is incorporated by reference for all purposes.

BACKGROUND

The present invention relates to a certification system with reduced hardware-resource requirements. More specifically, the present invention relates to a new system for certifying data wherein smart devices interacting with such systems require fewer hardware resources.

In the past, businesses that were interested in allowing users to order goods and services on-line had to hire web designers to create web pages that enable a user to order goods or services and enable users to pay by entering their payment information. These businesses also had to engage with payment and merchant service providers to support electronic payments. More recently, as businesses are moving to smart device-based ordering, businesses again have to hire application designers to create apps that enable the user to order goods or services and enable the user to pay for the items. Similarly, these businesses also have to separately engage with merchant payments service providers to support electronic payments such as credit card payments, or the like.

A problem with the proliferation of merchant-specific apps is that end users often find their smart devices overloaded with the many different apps. For example, one for Walmart, one for Target, one for Costco, one for Macys, one for Starbucks, one for Peets, one for Home Depot, one for Lowes, and the like. The large number of apps makes it harder for a user to easily find the app there are looking for on their smart phone. Further, because the user has to install more and more applications, users need to have more and more storage memory in their smart devices. Because of this problem, users are forced to buy more expensive smart devices with larger and larger storage capacities.

Additionally, another problem faced by end users with on-line ordering as well as app-based ordering of goods and services is the lack of user privacy. Because the users must constantly enter their personal information (name, address, etc.) as well as payment data (e.g. credit-card numbers) to merchants via their web sites or apps, users are sometimes wary of or discouraged from ordering on-line. Additionally, as users order more and more on-line or via apps, there is a greater risk that users' data (e.g. name, address, payment information) that are stored in the Merchants' databases will be stolen.

These problems are also relevant to private party-type transactions, where one party desires to send or receive money, or the like from another party. For example, in the past to conduct transactions, both parties are required to have the same type of software (e.g. Venmo, etc.) installed on their devices and both parties must be registered with that specific service before they can transact. This mismatch of application software also causes parties to abandon transactions.

In addition, in the past, to conduct transactions, many legal and financial documents required certification stamps such as notary stamps, medallion stamps, or the like, before they are trusted by other parties. To obtain such stamps, users had to gather the document, supporting documentation, personal identification, and the like and bring them to a notary office or bank during office hours. If the certifier were satisfied by these documents, they typically signed and then imprinted their stamp onto a certifying document, made an entry on their notary register, and had the person also sign the ledger. These certifying process was very formalistic and restrictive.

Problems with this approach included that typically only the original certifying document was recognized by companies or financial institutions. If the user needed multiple notarized copies, they had to go through the same process and expense for each notarized copy. Another problem was that it was very inconvenient for people needing a document notarized to take time off to go to the bank or notary office to get it stamped. Yet another problem was the certification allowed the underlying document (e.g. a will) to be modified after certification.

A more fundamental problem is that notaries are very limited in the types of documents they can attest to, typically a printed certifying document, and not the underlying document itself. Their certification capabilities do not keep up with the certification requirements of the digital economy, where trust and the authentication of items, and the like, are even more important between world-wide transacting parties.

In light of the above, what is needed are improved certification systems that address the problems described above with reduced number of drawbacks.

SUMMARY

The present invention relates to a transaction system with reduced hardware-resource requirements. More specifically, the present invention relates to a transaction system wherein smart devices interacting with such systems require fewer hardware resources.

Some embodiments include a authentication/web service 100, a transaction/payment service 102, an application service 104, a number of merchants (providers) 106, 108, etc. (e.g. good or service providers), and user smart devices, e.g. 110. In some examples, the authentication/web service 100 enables on-line (including app) transactions between merchants (e.g. 106) and the user smart devices (e.g. 110) without the merchants having to hire personnel to write the full application software, and in some examples without having to engage with additional payment processors. In some embodiments, authentication/web service 100 provides custom merchant metadata to smart phones on demand for each merchant. The merchant metadata 126 may include specification of goods or services available, prices, payment options, product images, and the like. In some examples, the metadata may also include a specification of an application 128 associated with the transaction provider that may be delivered on-demand. This application 118 may be executed upon smart phones and display the merchant-specific data described by the merchant metadata in the form of one or more graphical user interfaces (e.g. ordering screens 130). In some embodiments, the application 118 may be served by an application provider service 104. In some embodiments, merchant metadata may be received from specified URLs, network locations, or provided by the merchants directly.

In various embodiments, users of the smart phones can select one or more items from a merchant's graphical user interfaces on their smart phones and in some cases also effect the transaction or checkout via the application. In some cases, a transaction/payment service 102 on the smart phone may provide its own mechanism for paying such as Apple Pay, or the like. In other cases, other transaction/payment service 102 may be used. In various embodiments, the requesting party of the transaction may be the application from the transaction provider, accordingly, once the transaction/payment service 102 processes the payment, the application on the smart phone receives the acknowledgement of the successful payment. In turn, the application provides the acknowledgement back to the authentication/web service 100, and the acknowledgement is typically sent back to the merchant. Once the acknowledgement is received by the merchant, the merchant may provide the good or service to the user.

In various embodiments, different merchants are supported by the authentication/web service 100 via the storage and use of merchant-specific metadata (e.g. specification of items, GUI layout, colors, images, etc.). The application developed by the authentication/web service 100 and provided to the application service 104 may be merchant agnostic, but to the user of the smart phone, the graphical user interfaces of the application typically appear different based upon the merchant-specific metadata. In some embodiments, the application service may include or support decentralized identification (DID), distributed applications (DAPs), and the like.

In some embodiments, user privacy is maintained as payment processing is handled among the authentication/web service 100, the transaction/payment service 102 and the user, and the merchant does not necessarily receive such sensitive data. Additionally, the real-world identity of the users may be maintained on the users' smart phone and authentication/web service 100 and it need not be passed to the merchant. Instead, for example, the user may specify a nickname, or the like for pickup of the good or service (e.g. Suited guy, Backpack gal, etc.).

In embodiments directed towards more private party transactions, a first user of a first smart device (e.g. a wearable device) uses a second smart device (e.g. a smart phone or tablet) possessed by a second user to receive metadata associated with the first user on demand. The user metadata may include contact information, personally identifiable information, aliases, usernames, software unlock keys, transaction prices, transaction payment options, images, and the like. In some examples, the metadata may also include a specification of an application associated with a transaction provider service. Similar to the above, this application may be downloaded on-demand from an application provider service and be executed upon the second smart device. The smart phone then displays the first user-specific data described by the first user metadata in the form of one or more graphical user interfaces (e.g. information screens). In some embodiments, the first user metadata may be received in the second smart device from a URL, a network location, or from the first smart device directly.

In various embodiments, the first or the second user may use the smart phone and select one or more items from the displayed application graphical user interfaces. In some cases, the application may transact with a transaction service (such as a payment service provided by the smart phone such as Apple Pay, Google Wallet or the like). In some cases, other third-party payment services, e.g. PayPal, Venmo, etc. may be supported. In other embodiments, the transaction service may support transfer of other types of data, e.g. secure encrypted files, digital assets, software keys, personal information of the first user, and the like. After a transaction is processed by the transaction provider service, the application on the smart phone receives the acknowledgement of the successful data (or money) transfer. In some embodiments, user privacy is maintained as payment processing is handled by the transaction provider service, and the second smart device does not receive sensitive data from the first user of first smart device such as a real name, phone number, etc. In some embodiments, in response to the acknowledgement, the smart phone may direct a physical action to be taken for the first user, such as opening a security gate, and the like.

In some embodiments, the first smart device may be a wearable device such as smart ring, a smart watch, smart glasses, smart headphones, or the like; and the second smart device may be a smart watch, smart phone, portable computing device or the like.

According to one aspect, a method for a system is disclosed. A technique may include sensing with a sensor of a smart device, a plurality of advertisement data associated with a plurality of wearable devices disposed proximate to the smart device, wherein the plurality of advertisement data comprises a first advertisement data associated with a first wearable device and a second advertisement data associated with a second wearable device, determining with a processor of the smart device, an executable application in response to the first advertisement data, and receiving with a first transceiver of the smart device, the executable application from an application provider service 104. A process may include executing with the processor the executable application, displaying on a display of the smart device under direction of the executable application, a first graphical user interface in response to the first advertisement data, wherein the first graphical user interface comprises a first plurality of options selectable by a first user of the first wearable device, and receiving on the display of the smart device, a selection of a first transaction request on the first graphical user interface by the first user or the second user. A method may include sending with the first transceiver, first data associated with the first user of the first wearable device and the first transaction request to a transaction service 102, receiving with the first transceiver, first authorization data from the transaction service 102 in response to the first data and the first transaction request, and outputting with the smart device a physical output, in response to the first authorization data. A process may include determining with the processor of the smart device, the executable application in response to the second advertisement data, receiving with the first transceiver of the smart device, the executable application from the application provider service 104, and executing with the processor the executable application. A technique may include displaying on the display under direction of the executable application, a second graphical user interface in response to the second plurality of metadata, wherein the second graphical user interface comprises a second plurality of options selectable by the second user of the second wearable device, receiving on the display of the smart device, a selection of a second transaction request on the second graphical user interface by the second user, and sending with the first transceiver, a second data associated with the second user of the second wearable device and the second transaction request to the transaction service 102. A method may include receiving with the first transceiver, second authorization data from the transaction service 102 in response to the second data and the second transaction request, and outputting with the smart device the physical output, in response to the second authorization data.

According to another aspect, a system is described. An apparatus may include a transaction service configured to process a plurality of transactions including a first transaction and a second transaction, and a smart device coupled to the transaction service. A smart device may include a sensor configured to sense a plurality of advertisement data associated with a plurality of wearable devices disposed proximate to the smart device, wherein the plurality of advertisement data comprises a first advertisement data associated with a first wearable device and a second advertisement data associated with a second wearable device, and a processor configured coupled to the sensor, wherein the processor is configured to determine an executable application in response to the first advertisement data and to the second advertisement data, and configured to execute the executable application. A smart device may include a display coupled to the processor, wherein the display is configured to display a first graphical user interface in response to the first advertisement data, wherein the first graphical user interface comprises a first plurality of options selectable by a first user of the first wearable device, configured to receive a selection of the first transaction request on the first graphical user interface by the first user, wherein the display is configured to display a second graphical user interface in response to the second advertisement data, wherein the second graphical user interface comprises a second plurality of options selectable by a second user of the second wearable device, and configured to receive a selection of the second transaction request on the second graphical user interface by the second user, a first transceiver coupled the processor, wherein the first transceiver is configured to receive the executable application from an application provider service, configured to send first data associated with the first user of the first wearable device and the first transaction request to the transaction service, configured to receive first authorization data from the transaction service in response to the first data and the first transaction request, configured to send second data associated with second first user of the second wearable device and the second transaction request to the transaction service, and configured to receive second authorization data from the transaction service in response to the second data and the second transaction request, and an output portion configured to provide a physical output to the first user in response to the first authorization data and the second authorization data.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
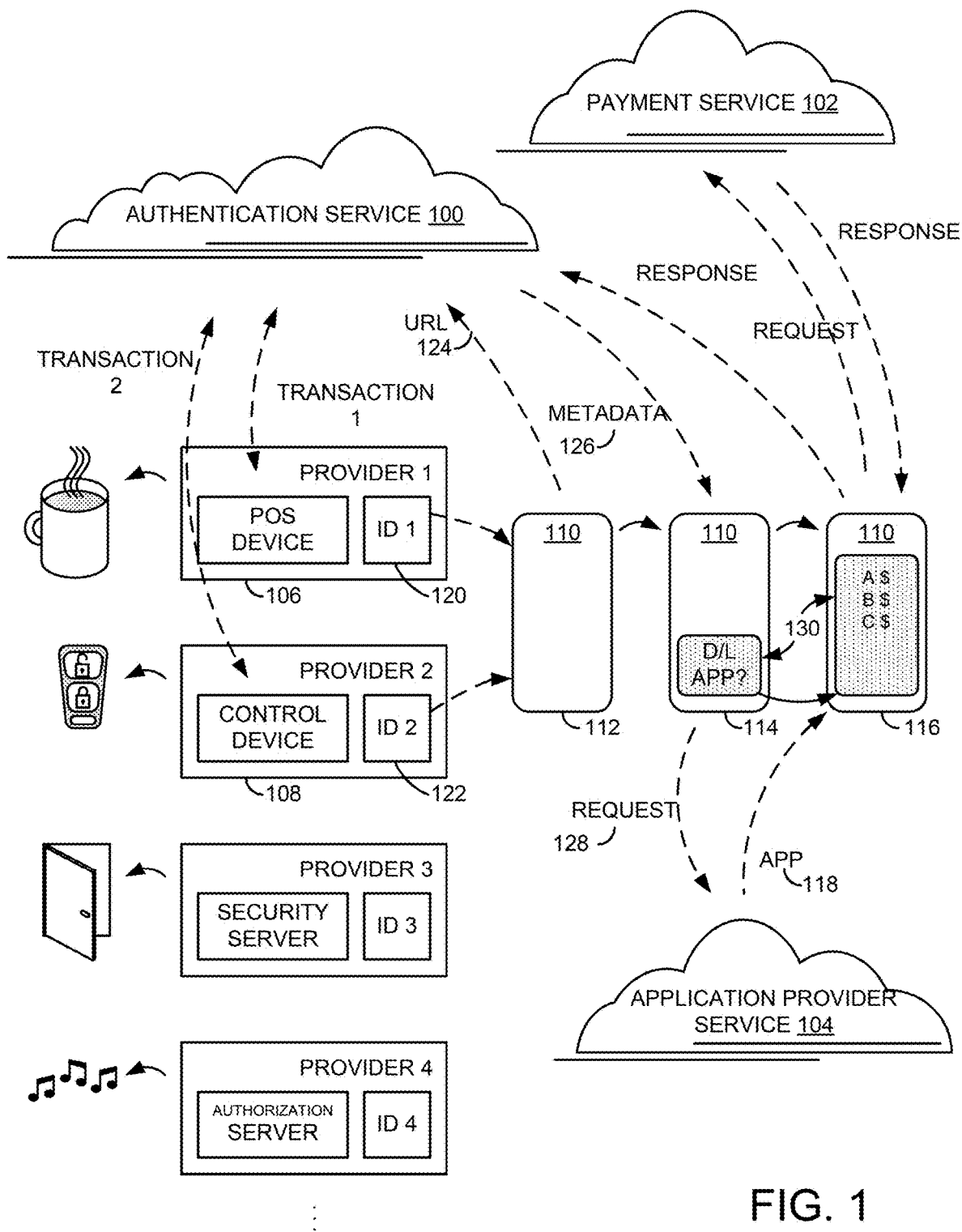
FIG. 1 illustrates a system diagram according to various embodiments.

FIG. 1 illustrates a block diagram according to some embodiments of the present invention. More specifically, FIG. 1 includes a authentication service 100 (which may also provide a web service), a transaction/payment service 102, and an application service 104. FIG. 1 also includes a number of providers: Provider 1 106, Provider 2 108, etc., where each provider may be independent of each other, e.g. different merchants, providers or service providers. Additionally, providers are typically independent of services 100-104, above. Being independent implies that any inter-network communication will be on more of an ad-hoc basis, where trust between these systems must be established, as described herein. FIG. 1 also illustrates a representative a smart device 110 in a variety of states 112-116, as will be discussed below when interacting with the above components.

In various embodiments, the providers of services 100-104 are cloud-based providers, distributed application providers, distributed/decentralized identity services, or the like, whose service may be performed on any number of physical servers or virtual machines. In some embodiments, authentication/web service 100 is currently designed to be operated by the assignee of the present patent application, Proxy, Inc. As will be described in greater detail below, authentication/web service 100 provides a functional separation between merchants (e.g. providers 106, 108, etc.) and smart devices (e.g. smart phones 110, smart watches, smart wearables) of users. This separation greatly reduces the financial and logical burden of merchants or providers to support ordering from smart devices, as discussed above. Additionally, this separation greatly reduces the hardware requirements of smart devices. Still further, this separation increases user privacy, as discussed herein.

In some embodiments, transaction/payment service 102 may be an on-line service provider that enables payments from a smart device/smart phone. As will be described below, the transaction/payment service 102 may interact directly with users' smart devices to facilitate payment for goods and services without users' financial data being exposed to other portions of the illustrated embodiment (e.g. to providers 106, 108, etc.).

In various embodiments, application provider service 104 may be a just-in-time provider of software code that is executable by smart devices. As will be described below, in some examples, using some of the metadata specified by authentication/web service 100 providers, the application services 104 may determine which software application or code is required by the smart devices (e.g. 110) and provides the software code 118 on-demand or just-in-time. In some cases, the software application may be cached upon a smart device.

Figure 2A:
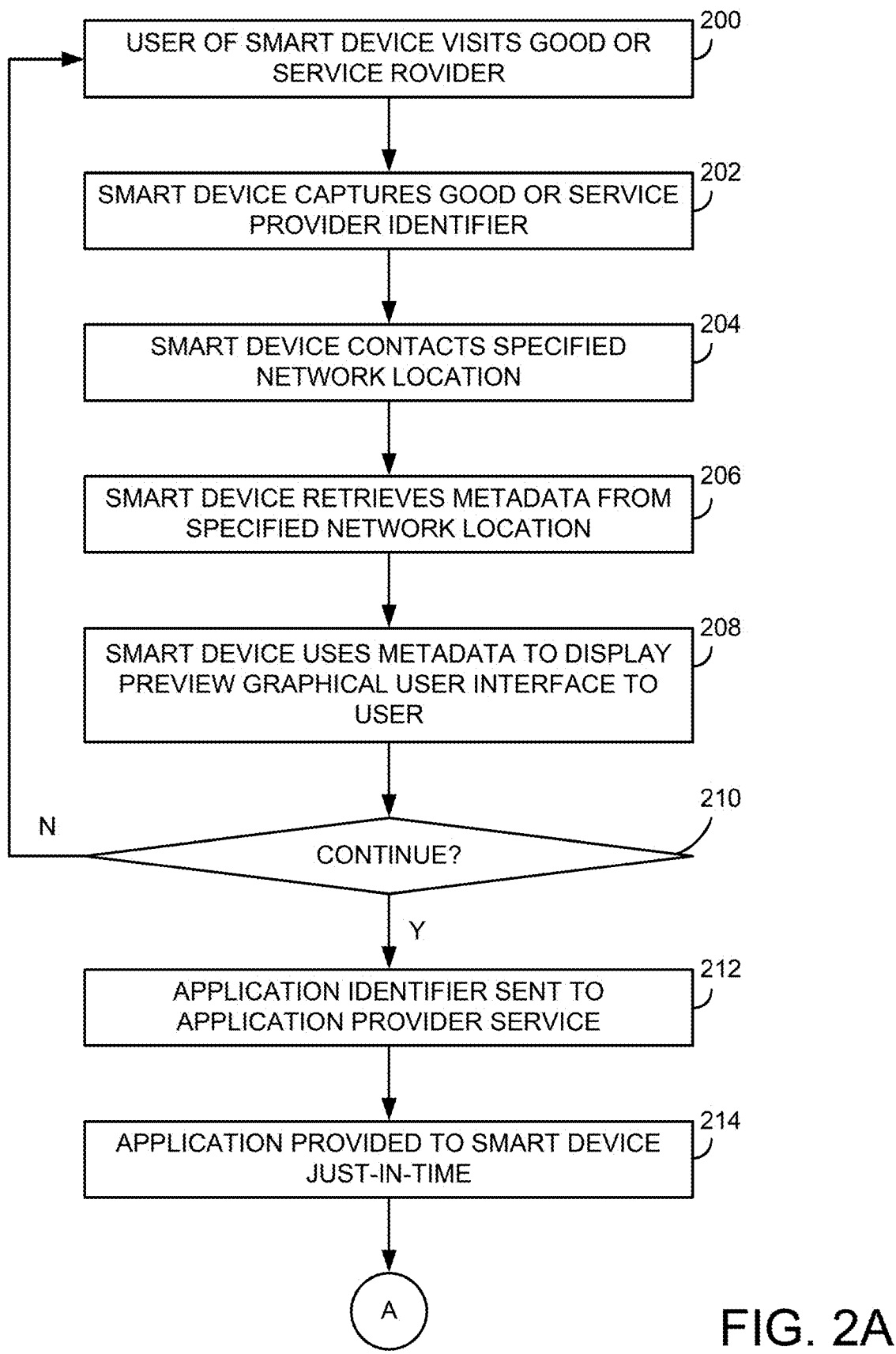
FIGS. 2A-B illustrate a flow diagram according to various embodiments.
Figure 2B:
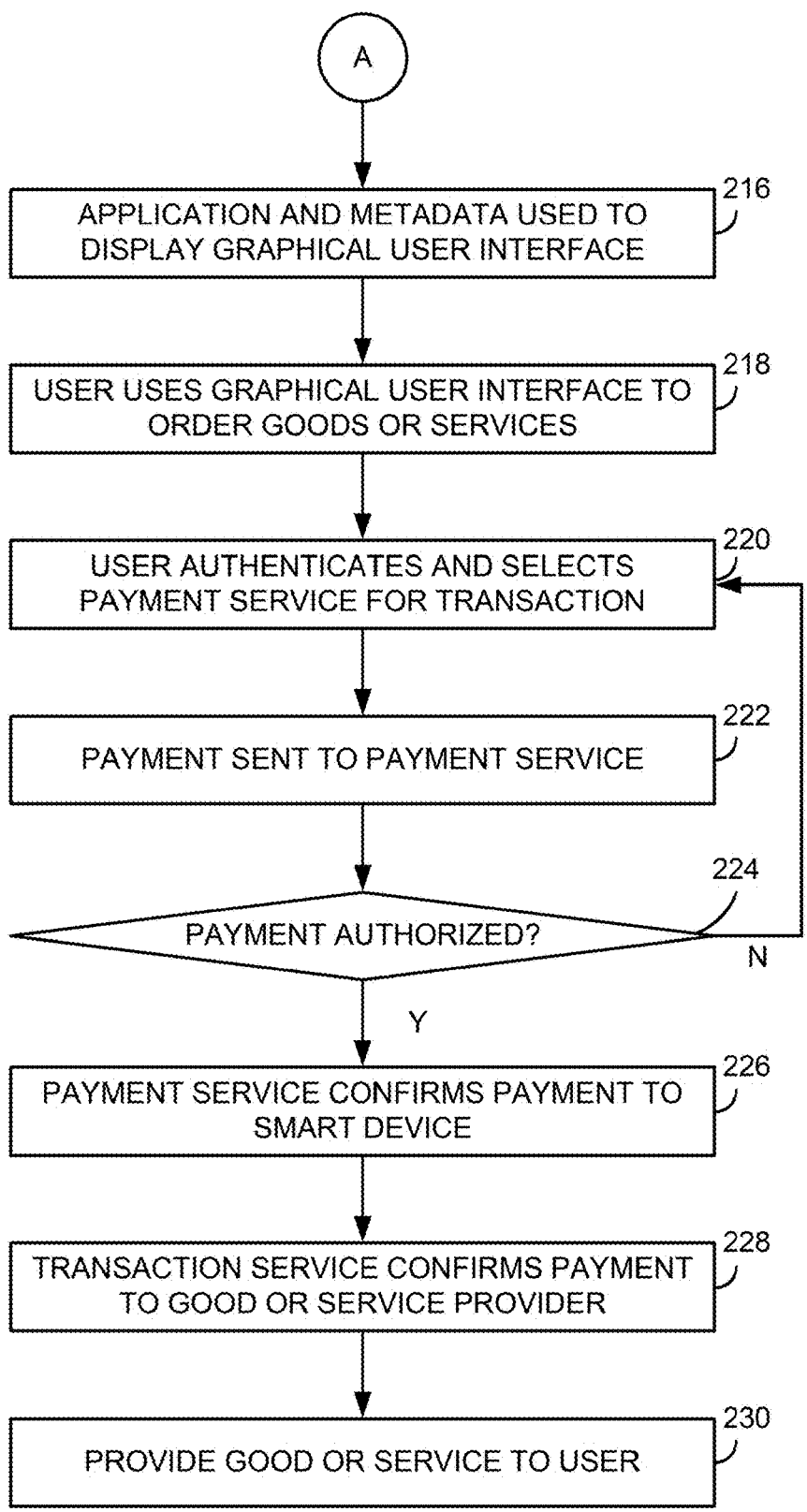

FIGS. 2A-2B illustrate a flow diagram according to some embodiments. For convenience, reference is made to the various components illustrated in FIG. 1.

Initially, a user having a smart device 110 (e.g. smart phone, smart watch, etc.) in state 112 visits a merchant, such as provider 106, provider 108, or the like, step 200. In this example, state 112 represents the state of smart device 110 prior to having a current relationship with provider 106, or the like. While at a specific merchant/provider, the user uses smart phone 110 to capture an identifier of the merchant, such as ID 120, ID 122, or the like, step 202. In some embodiments, the IDs are in the form of an optical code, a one or multidimensional bar code, an NFC tag, a text message, a Bluetooth signal, a Zigbee signal, an ultrawide band (UWB) signal, a received e-mail or text message, an ID from a website, or the like.

In some embodiments, the IDs may specify and include a network address, uniform resource location (URL), web site or the like. As illustrated, in FIG. 1, the network address may typically point 124 to a location hosted by authentication/web service 100, and the smart device 110 contacts the network address 124, step 204. In response, the authentication/web service 100 may return metadata 126 associated with the merchant/provider having the specified ID.

In various embodiments, the metadata 126 may include a description of items offered by merchant/provider 106, for example, such as, prices of items or services offered, images of items, images of logos, and the like, a preview, step 206. The smart devices retrieve various network assets within metadata 126 or specified by metadata 126, and smart device 110 displays them to the user, step 208. In this example, smart device 110 enters state 114. In some embodiments, the metadata 126 may also specify an identifier associated with software code associated with the provider that is executable on the smart device 110.

In some embodiments, the user is given the option whether to proceed and order from the merchant or not, step 210. If not, the process may terminate. If the user wishes to continue, a request 128 including the identifier associated with the software code, is provided to an application service 104, step 212, and in real-time, just-in-time, or on-demand, the application service 104 returns the executable software code 118 to smart device 110, step 214.

Next, in various embodiments, smart device 110 executes the software code 118 and may also use other portions of the metadata 126 as inputs. These metadata 126 can be used by the software to output one or more graphical user interfaces to the user, step 216. For example, the metadata 126 may specify a design for a graphical user interface (GUI) layout 130 including name and logo of the merchant or provider, images of items offered, prices of items, payment terms, or the like. In various examples, smart device 110 enters state 116.

As can be seen in FIG. 1, it is contemplated that different merchants will have different offerings and desire their GUIs to have different appearances, accordingly, the metadata associated with one merchant will be different from the metadata associated with another merchant. However, in various embodiments, it is contemplated that the executable software code downloaded to the smart device will be substantially the same, if not identical. By providing this capability, users' smart phones 110 will not have to store different apps to support different merchants causing the users' smart phones to have high memory storage requirements. Instead, in some embodiments, a single software code package supports many different merchants, thus the users' smart phones storage requirements may advantageously remain low. Additionally, in various embodiments, this just-in-time providing of the software code advantageously further reduces the users' smart phone storage requirements.

In various embodiments, the user views the GUI 130 on their smart phone 110 and selects one or more items such as Item A, Item B, etc. These items may be items offered by the merchant to purchase, buy, license, access, transfer, borrow or the like. As described herein, a transaction price for the items may be provided to the user, and the user may select a transaction with the GUI 130, step 218.

In some embodiments, to pay for the item, using the smart phone, the user may use one or more on-line payments services from within the software application to pay the specific merchant for the device, step 220. As an example, from within the software application, if the user wants to purchase an item, the user is provided with the option to use an on-line service, such as Apple Pay, or the like. After authenticating themselves to the smart phone or on-line transaction/payment service 102 (e.g. via fingerprint, password, facial image), the users' smart phones send the transaction request to the transaction/payment service 102 provider, step 222. In some embodiments, the payment request may include a payment amount, a device account number (DAN), a user token, identifier associated with the user, or the like. In some examples, the payment request may be encrypted.

In various embodiments, the payee of the payment request may be the merchant/provider (e.g. 106, 108, etc.), the authentication/web service 100, or smart device 110 user. In the first case, the merchant should register with the transaction/payment service 102 to receive payments. In the second case, the authentication/web service 100 registers with the transaction/payment service 102 to receive payments, and the merchants/providers register with the authentication/web service 100 to receive payments. The second case may be desired if the merchant desires a simplified unified service from the authentication/web service 100, e.g. providing custom GUIs, providing the application software, providing orders, and providing or facilitating payments and the like. Such embodiments greatly simplify their hardware and software resources.

In some embodiments, the transaction/payment service 102 decides whether to approve the payment, step 224. Typically, this is based upon approval of the payment processor, e.g. credit card provider, bank or the like. If the payment is approved, the transaction/payment service 102 may return a token or other data indicating approval of the payment to the software application running on the users' smart phone, step 226. In turn, the software application on the smart phone may direct that a message be provided to the authentication/web service 100 that the payment has been approved. In some examples, this may be the token or other data (e.g. flag-bit) indicating payment approval from the payment provider. In some examples, if the transaction/payment service 102 provides a token, e.g. a digitally signed message, the authentication/web service 100 may then authenticate the token, for example by verifying the digital signature.

In various embodiments, if the authentication/web service 100 determines that the payment has been approved, the authentication/web service 100 may send a secure message to the merchant specifying the order and that payment has been approved, step 228. In some embodiments, the secure message may include a digitally signed or encrypted payload, where the payload includes the order details. This secure message may then be decrypted to provide or verify the order.

In some examples, the authentication/web service 100 may provide the merchant with a dedicated tablet that indicate the secure orders for goods or services that originate from the authentication/web service 100. In such examples, the transaction provider may provide the order via cellular data, WIFI, or other wired or wireless method. In other examples, the authentication/web service 100 may interface with a point of sale (POS) system of the merchant/provider that securely indicates a good or service may be provided to the user.

In various embodiments, in turn the merchant/provider e.g. 106 may provide the good e.g. coffee or service to the user, step 230. In some embodiments, the good may be provided via a control of a peripheral device (e.g. vending device) that provides: an edible item, a key, a stored-value card, or any other physical item. In some embodiments, the service may be facilitated by a security server that provides entry to a controlled-access area (e.g. concert arena, theater, sports area), entry to a mass-transit system, entry to an airline, bus, train, etc. In some embodiments, the service may be facilitated by an authorization server associated with the provider, that provides use of a hotel room, use of a computer, use of the internet, use of an on-line service (e.g. Netflix, Spotify, etc.), and the like. Subsequently, the process may then be repeated for smart device 110 user for another merchant/provider, the process may be repeated by the merchant/provider for a different smart device user, and the like.

Figure 3:
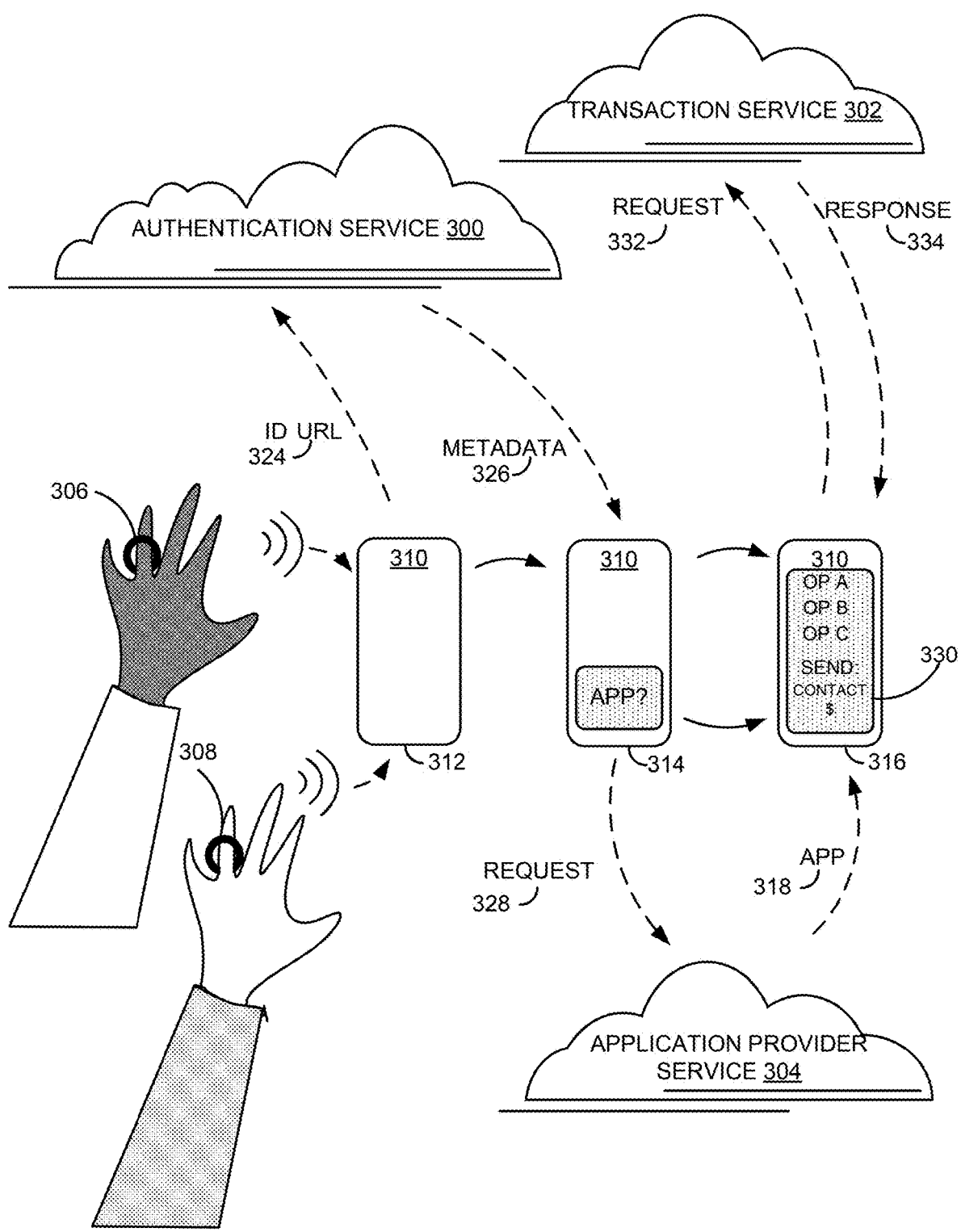
FIG. 3 illustrates another system diagram according to various embodiments.

FIG. 3 illustrates another block diagram according to some embodiments of the present invention. More specifically, FIG. 3 includes an authentication service 300 (which may also provide a web service), a transaction/payment service 302, and an application service 304. FIG. 3 also includes a number of users: user 306, user 308, etc., where each user may be independent of each other. Additionally, users are typically independent of services 300-304, above. Being independent implies that any inter-network communication will be on more of an ad-hoc basis, where trust between these systems must be established, as described herein. In the example in FIG. 3, users 306 and 308 wear wearable smart devices, e.g. rings, watches, earbuds, glasses, or the like. Additionally, FIG. 3 also illustrates a representative a smart device 310 (e.g. a smart phone) in a variety of states 312-316, as will be discussed below.

In various embodiments, the providers of services 300-304 are cloud-based providers whose service may be performed on any number of physical servers or virtual machines. In some embodiments, authentication/web service 300 is currently designed to be operated by the assignee of the present patent application, Proxy, Inc. As will be described in greater detail below, authentication/web service 300 provides a functional separation between users wearing wearable smart devices (e.g. 306, 308, etc.) and users of smart devices 310 (e.g. smart phones). This separation greatly reduces the hardware requirements of wearable smart devices 306, 308, etc. Additionally, this separation greatly reduces the hardware requirements of smart devices 310. Still further, this separation increases the privacy of users, as discussed herein.

In some embodiments, transaction/payment service 302 may be an on-line service provider that enables transactions between the smart wearable device and another smart device (e.g. a smart phone). Application provider service 304 may be a just-in-time provider of software code that is executable by smart devices 310. As will be described below, in some examples, using some of the metadata specified by authentication/web service 300 providers, the application provider service 304 may determine which software application or code is required by the smart devices (e.g. 310) and may provide the software code 318 on-demand or just-in-time.

Figure 4A:
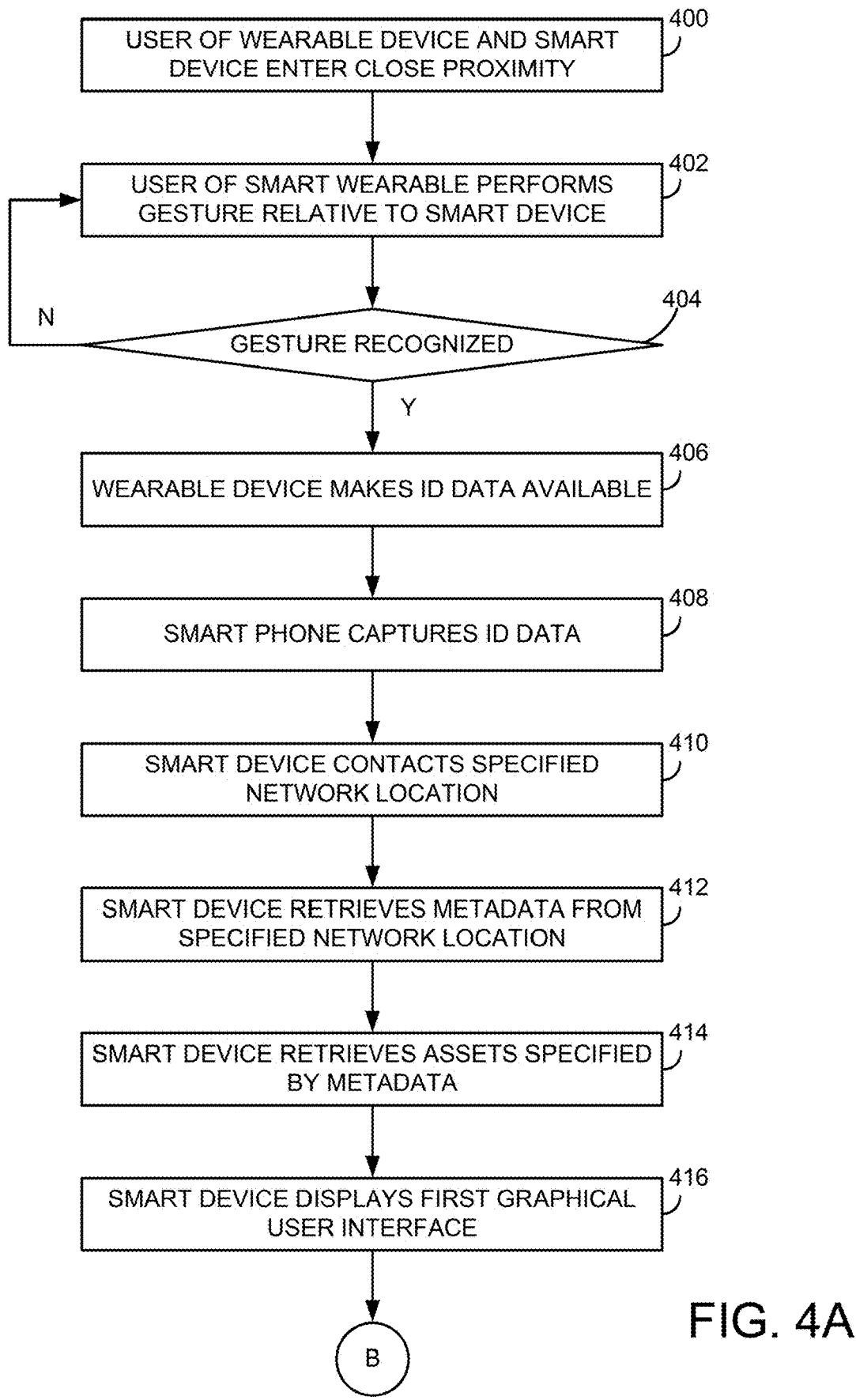
FIGS. 4A-C illustrate another flow diagram according to various embodiments.
Figure 4B:
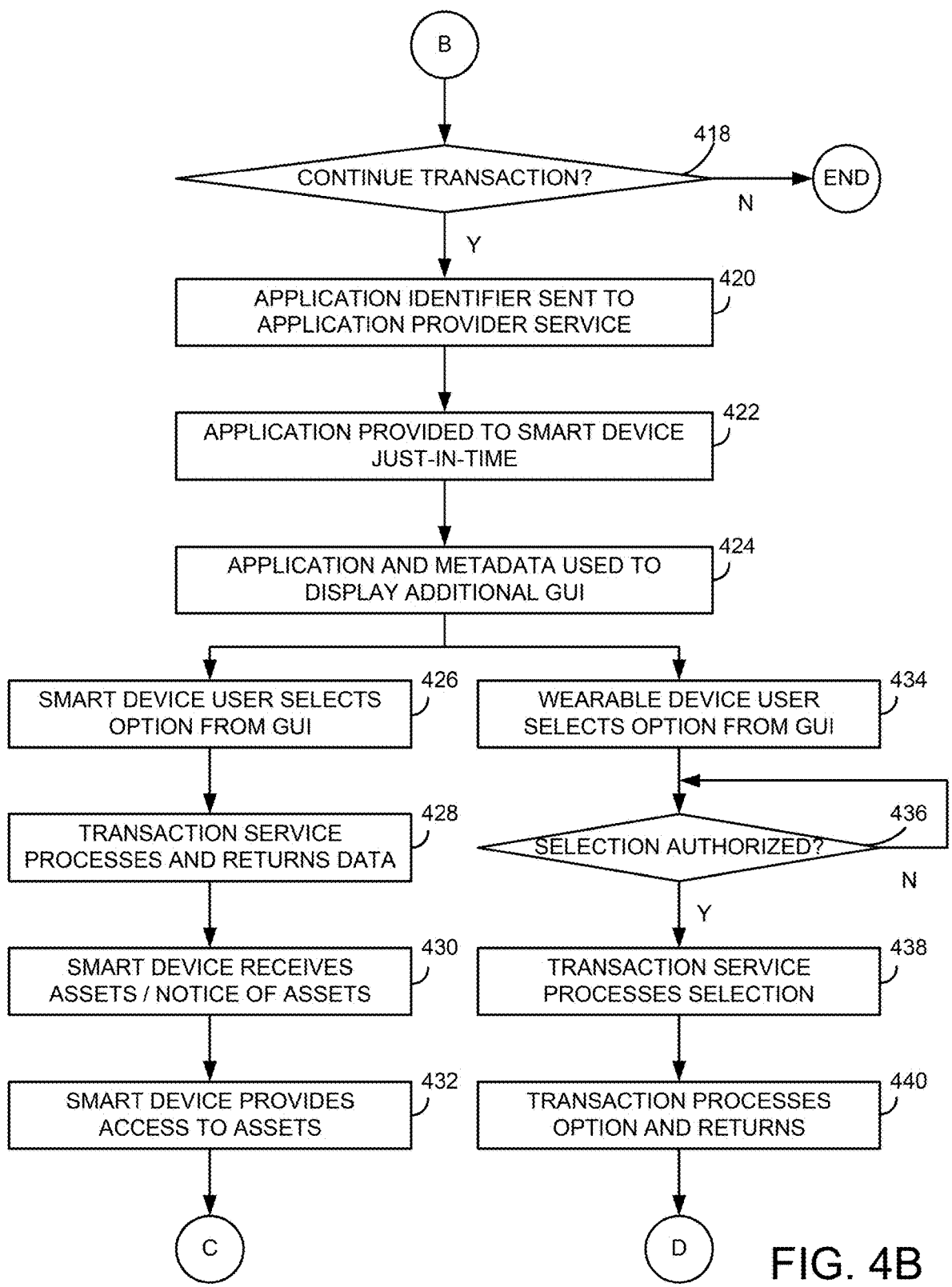
Figure 4C:
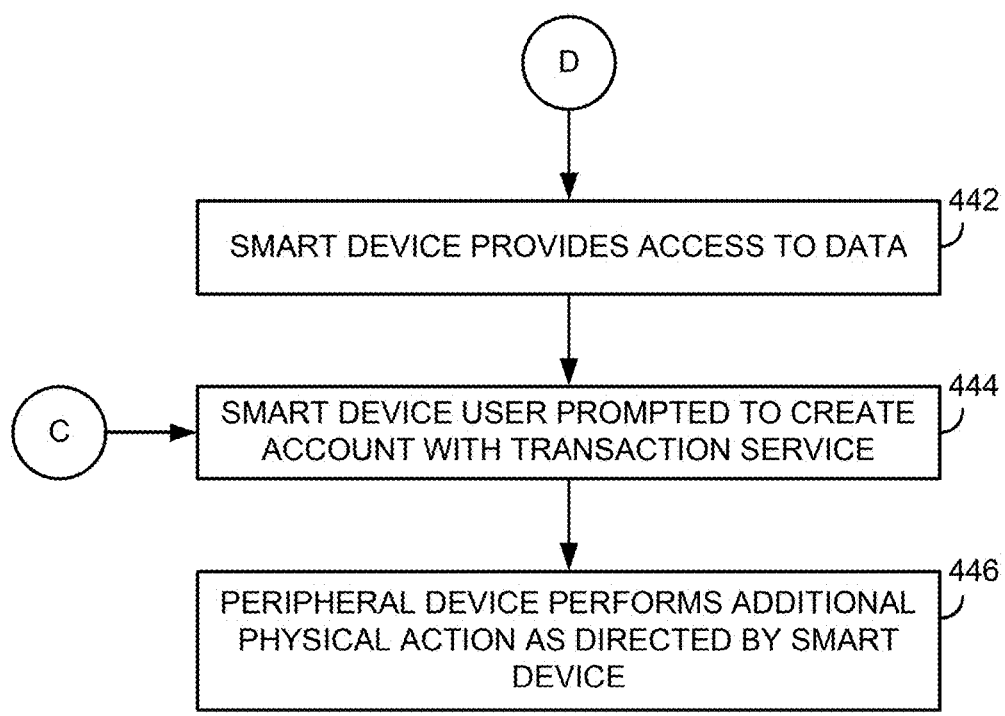

FIGS. 4A-4C illustrate a flow diagram according to some embodiments. For convenience, reference is made to the various components illustrated in FIG. 3.

Initially, a smart wearable device 306 (e.g. smart ring, smart wearable) and a smart phone 310 (e.g. smart phone, smart watch, etc.) in state 312 enter close proximity, step 400. In some examples, the wearable device user may be a consumer, and the smart phone user may be a vendor at a farmers' market; the wearable device user may be a ticket holder, and the smart phone user may be an usher; the wearable device user may be a celebrity, and the smart phone user may be a fan; the wearable device user may be a notary or other certifying authority, and the smart phone user may be someone seeking certification. In light of the present disclosure, one of ordinary skill in the art will recognize many other embodiments that are within the scope of the present application and claims. In this example, state 312 represents the state of smart device 310 prior to having any relationship with user 306, or the like.

In some embodiments, the user 306 then performs a specific action with their wearable smart device, such as waving their hand over smart phone 310, step 402. In other embodiments, other gestures may be used, such as clapping their hands twice, tapping the wearable smart device against a hard surface or smart phone 310 three times, rotating a smart ring around a finger once.

In some embodiments, the wearable smart device may use built-in sensors to capture biometric data of the wearer and compare it against authorized wearer biometric data. Biometric data may include: heartbeat data, blood vessel or capillary data, fingerprint data, audio data, or the like. In other embodiments, biometric data as well as recognized gestures are both required. In still other embodiments, biometric data and biometric verification may be performed when the user puts on the wearable device, for example a fingerprint may be verified when the user puts on a smart ring, a retina scan may be verified when the user puts on smart glasses, a hearing profile may be verified when the user puts on smart earbuds, and the like.

In some embodiments, when the specific gestures above are sensed and/or the biometric data of the user are verified, step 404, the wearable smart device may enable the output of identifier (ID) data, step 406. In other embodiments, verification need not be performed before the ID is enabled or output.

In various embodiments, the ID data may be in the form of an image on a surface of the smart device, an image displayed on a display of the smart device, or the like. Examples of the image may include an optical code, a one or multidimensional bar code, or the like. In other embodiments, the ID may be provided for output in the form of an NFC tag, a text message, a Bluetooth signal, a Zigbee signal, an ultrawide band (UWB) signal, an email message, an audio signal or the like. In some embodiments, this ID data can be captured by smart phones 310 within the vicinity of the wearable device, step 408. For example, smart phone may capture the ID image using a camera, capture audio ID data, receive a message via short-range receiver (e.g. Bluetooth, BLE, Zigbee, UWB), receive a message via wide-area receiver (e.g. 5G, 4G, Wi-Fi, or the like), and the like.

In some embodiments, upon receiving the ID, smart device 310 may contact authentication/web server 300, step 410. In various examples, the IDs may specify and include a network address, uniform resource location (URL), a web site or the like. As illustrated in FIG. 3, smart device 310 uses the network address 324 to reach a location hosted by authentication/web service 300. In response, the authentication/web service 300 may return metadata 326 associated with the specified URL, step 412.

In various embodiments, the metadata 326 may include a description of data associated with the user of wearable device 306. In some examples, the data may include some but not necessarily all of the following: an real name of the user, account information (e.g. Instagram, Snapchat, Twitter, Facebook), a physical address, contact information (e.g. email, phone), and the like. Alternatively, metadata 326 may include pointers to network locations where such data is stored. In cases where privacy is desired, metadata 326 may exclude personally identifiable information, and may instead include an account number, a username, a digital asset location, or pointers to such data within stored in transaction server 302, or the like. In some embodiments, metadata 326 may also include network locations where images, prices, logos, and the like are stored.

In various embodiments, the smart devices 310 may retrieve some, but not necessarily all of the network assets within metadata 326 or specified by metadata 326, step 414 and smart device 310 displays at least part of the assets to the user via a graphical user interface (GUI), step 416. In some embodiments, the GUI gives a user the option whether to proceed and continue the transaction or not. In this example, smart device 310 enters state 314. In some embodiments, the metadata 326 may also specify an identifier associated with software code associated with transaction service 302 or authentication service 300 that is executable on the smart device 310.

In some embodiments, the user may choose to continue or terminate the transaction, step 418. If the user wishes to continue the transaction, a request 328 including the identifier associated with the software code, is provided to an application service 304, step 420, and in real-time, just-in-time, or on-demand, the application service 304 returns the executable software code 318 to smart device 310, step 422.

Next, in various embodiments, smart device 310 executes the software code 318 and may also use other portions of the metadata 326 as inputs (e.g. list of options, images, etc.). The software code 218 enables smart device 310 to interact with transaction service 302. These metadata 326 can be used by the software to output one or more additional graphical user interfaces to the user, step 424. For example, the metadata 326 may specify a design for a graphical user interface (GUI) layout 130 including transactions options available. In some examples, the options may include providing information of the user of smart ring 306, such as a name (e.g. a real-name, an account identifier, etc.), providing contact information (e.g. e-mail address, real address, Instagram, telephone number, etc.), and the like as described herein. In additional embodiments, the GUI enables interaction with transaction server. In various examples, smart device 110 enters state 316.

As can be seen in FIG. 3, it is contemplated that different users of different wearable devices, e.g. 306 and 308 will have different accounts in transaction service 302, thus the GUIs in smart phone 310 will have different appearances, different options and the like. Accordingly, the metadata associated with one user will be different from the metadata associated with another user. However, in various embodiments, it is contemplated that the executable software code 318 downloaded to the smart device 310 will be substantially the same, if not identical. By providing this capability, users' smart phones 310 will not have to store different apps to support the different wearable smart device users (causing the users' smart phones to have high memory storage requirements). Instead, in some embodiments, a single software code package, e.g. 318 supports many different wearable smart device users, thus the users' smart phones storage requirements may advantageously remain low. Additionally, in various embodiments, this just-in-time providing of the software code 318 advantageously further reduces the users' smart phone storage requirements.

In some embodiments, smart phone 310 user may interact with transaction service 302, and in other embodiments, wearable device (e.g. 306) user may interact with transaction service.

In the first case, smart phone 310 user views the GUI 330 and selects one or more options listed, e.g. Option A, Option B, Option C, etc., step 426. These options may be request actions 332 provided by transaction service 302. In response, transaction service 302 may perform one or more operations, step 428, and may return data 334 to smart phone 310, step 430. These steps may again use the same wide-area network for communications, e.g. Wi-Fi, 5G, etc. Smart device 310 may then display the asset or indication of the asset to the user. In some embodiments, the asset may be a ticket to an event (e.g. a seat assignment, a back-stage pass, access to a controlled-access area, or the like). In some embodiments, the asset may be a digital ticket or the like. Further discussion will be provided in conjunction with step 446, below.

As an example, a user/promoter of wearable device 406 may be associated with a company, and an Option A may be a "Buy one, get one at 50% coupon", Option B may be a "Free sample size coupon", Option C may be a "Get a free digital download", and the like. In this example, as the promoter waves their hand over the user's smart phone 310, the process above is performed, and the user of smart phone 310 may then be given the choice of one of these options. The smart phone user may select one option, e.g. Option A, and in response, transaction service 302 may generate and provide a digital coupon back to smart phone 310. Smart phone 310 user may then use the digital coupon for checking out in a virtual or brick-and mortar store.

As another example, a wearable device 406 user may be a celebrity (e.g. appearing at a fund raiser), and an Option A may be a download of a unique image of the star (e.g. with a logo of the fund raiser), Option B may be a unique voice greeting of the star (e.g. mentioning the fund raiser), Option C may be a download link of software (e.g. with a fund raiser banner). In this example, as the celebrity waves their hand over the user's smart phone 310, the process above is performed, and the user of smart phone 310 may then be given the choice of one of these options. Smart phone 310 user may select one option, e.g. Option B, and in response, transaction service 302 may generate and provide an audio file or a link to an audio file back to smart phone 310. In some embodiments, the data returned to smart phone 310 may be digitally signed or hashed with additional data of smart phone 310 (e.g. IMEI/MEID/ICCID, GPS coordinates, or the like) so that authenticity of that data can be verified. In this way, smart phone 310 user may display and have a unique and valuable souvenir based upon their close interaction with the celebrity. In some embodiments, the data returned may be a pointer or a link to a file in a cloud service or other database; the data may be a location in a block-chain where a digital asset (e.g. a non-fungible token, NFT) resides, where ownership is recorded, or the like; where a distributed application (DAP) can be sourced; and the like.

As yet another example, a wearable device 406 user may be an influencer, e.g. TikTok or Instagram influencer, and an Option A may be a link to a private post of the influencer, Option B may be an upcoming itinerary of the influencer, Option C may be a link to goods or services sponsored by the influencer (e.g. a list of their clothes, and the like). In this example, as the influencer walks by or waves their hand over the user's smart phone 310, the process above is performed, and the user of smart phone 310 may then be given the choice of multiple options. Smart phone 310 user may then select multiple options, e.g. Option C, and in response, transaction service 302 generates a list of clothes worn by the influencer and returns them back; smart phone/device 310 user then selects option Option A, and in response, transaction service 302 may provide the link to a private post of the influencer which smart phone 310 user may view. Similar to the above, a digital signature and/or hash with smart phone 310 data may be used to provide authenticity.

In a second case, wearable device 302 user views the GUI 330 and selects one or more options listed, e.g. Option A, Option B, Option C, etc., step 434. In some examples, the options may involve the transfer of private data to smart device 310, such as: a real-name, a telephone number, an email address, a mailing address, or the like. In other examples, the options may involve the transfer of digital assets stored or accessed by transaction service 302, such as: electronic currency identifiers, barcodes (e.g. barcodes, QR codes) associated with assets (e.g. NBA Finals tickets, museum tickets), or the like. In still other examples, an amount of money may be transferred from an account of the user of wearable device 302 to smart phone 310 user, an amount of money may be requested to be transferred into an account of the user of wearable device 302, and the like.

In response to the selection, transaction service 302 may require wearable device 302 user to authorize the transaction, for example, by entering a password, PIN, or the like, step 436. This additional level of security is sometimes desirable to allow wearable device 302 user to control the type of data provided to smart device 210, to initiate a financial transaction, or the like. In other embodiments, other types of authorization data may be required, such as NFC, UWB, visible or invisible light, or other types of communications between wearable device 306 and smart phone 310.

In response to the proper authorization, transaction service 302 may perform one or more transaction operations, step 438, and may return transaction data or a notice of the transaction to smart phone 310, step 440. In response, the user of smart phone 310 may view or access the transaction data, step 442. In some embodiments, the user of smart phone 310 or the like, may desire to create an account within transaction service 302 for sake of convenience.

As an example, a user of wearable device 306 wishes to transfer their private e-mail address or phone number to smart device 310 user. To do so, wearable device 306 user waves wearable device 306 in proximity to smart phone 310. After choosing to temporarily install the software application, if not already cached, GUI 330 is displayed, and wearable device 306 selects an option on GUI 330 to provide wearable device 306 user's e-mail address, phone number, etc. Next, in this example, wearable device 306 user authenticates themselves to transaction service 302 via password, or the like, and transaction service 302 returns the e-mail address, phone number, etc. to smart phone 310. Smart phone 310 user may then store the data into their contact list.

As another example, a user of wearable device 306 goes to a farmers' market and wants to purchase a good from a smart device 310 of a farmer. Wearable device 306 user waves wearable device 306 in proximity to the farmer's smart phone. After choosing to temporarily install the software application, if not already downloaded, GUI 330 is displayed, and wearable device 306 user requests a specific amount of money to send to the farmer. Next, wearable device 306 user again authenticates themselves to transaction service 302 via PIN, or the like, and transaction service 302 deducts the specific amount from wearable device 306 user's account with transaction service 302. In one case, the farmer may be sent the transaction using any conventional service, for example, Apple Pay, Google Pay, PayPal, or other method specified by the farmer. In another case, an account may dynamically be established within transaction service 302, and the specific amount may be associated with that account. After the transaction is processed, transaction service 302 may provide smart device 310 with a confirmation message, that will be displayed to the users. The farmer may then provide the goods to wearable device 306 user.

As merely another example, a user of a wearable device 306 is a notary or other certification provider and smart device 310 user desires to certify a document, an image, a digital asset, presence of smart device 310 at a specific location, or the like. After the notary verifies identification data of smart device 310 user, or the like, the notary waves their wearable device 306 in proximity to smart phone 310. After choosing to temporarily install the software application, if not already installed, GUI 330 is displayed, and the notary can select from a list of options displayed. In some examples, options for certification may include: notarizing of a file (e.g. via digital signature), certificating presence of a person (with or without taking a picture) at the present location (e.g. smart device 310 user was present at a particular time and place), certifying that they witness a particular transaction occurring (e.g. a tenant handed over keys to a landlord), and the like. In some embodiments, the notary or certification provider may also enter a message, via text, or audio message indicating what they are certifying. After selection, the notary authenticates themselves to transaction service 302 via NFC, or the like, transaction service 302 processes (e.g. digitally signs the document, notary message, or the like with a private key of the notary) the request. In response, transaction service 302 may return the digitally signed document to smart device 310 for storage and evidentiary purposes.

In a further example, a user of wearable device 306 goes to a controlled access area (e.g. a theater, a concert hall, a sports stadium, an airport, or the like) and wants to enter the controlled access area. Wearable device 306 user waves wearable device 306 in proximity to a smart device 310 (e.g. a smart kiosk). After choosing to temporarily install the software application, if not already installed, GUI 330 is displayed, and wearable device 306 user requests retrieval of a ticket from transaction service 302. Next, wearable device 306 user again authenticates themselves to transaction service 302 via password, or the like. In one embodiment, transaction service 302 downloads the ticket into smart device 310 which may then print a hardcopy of the ticket for the user. Wearable device 306 user may then retrieve the ticket, present it to appropriate personnel, and if authenticated, allow the user to pass. In another embodiment, transaction service 302 downloads the digital ticket into smart device 310 and in response, smart device 310 determines the authenticity of the digital ticket. If the digital ticket is authentic, smart device 310 sends a message or the like to a coupled peripheral device, instructing that a particular action occur. As examples of this, smart device 310 may instruct a gate to open, may instruct a security door to unlatch or open, may instruct a turnstile to unlatch and allow it to be turned, may instruct particular elevator buttons to be activated, and the like. Control of such peripheral devices by smart device 310 is referred-to in step 446.

Figure 5:
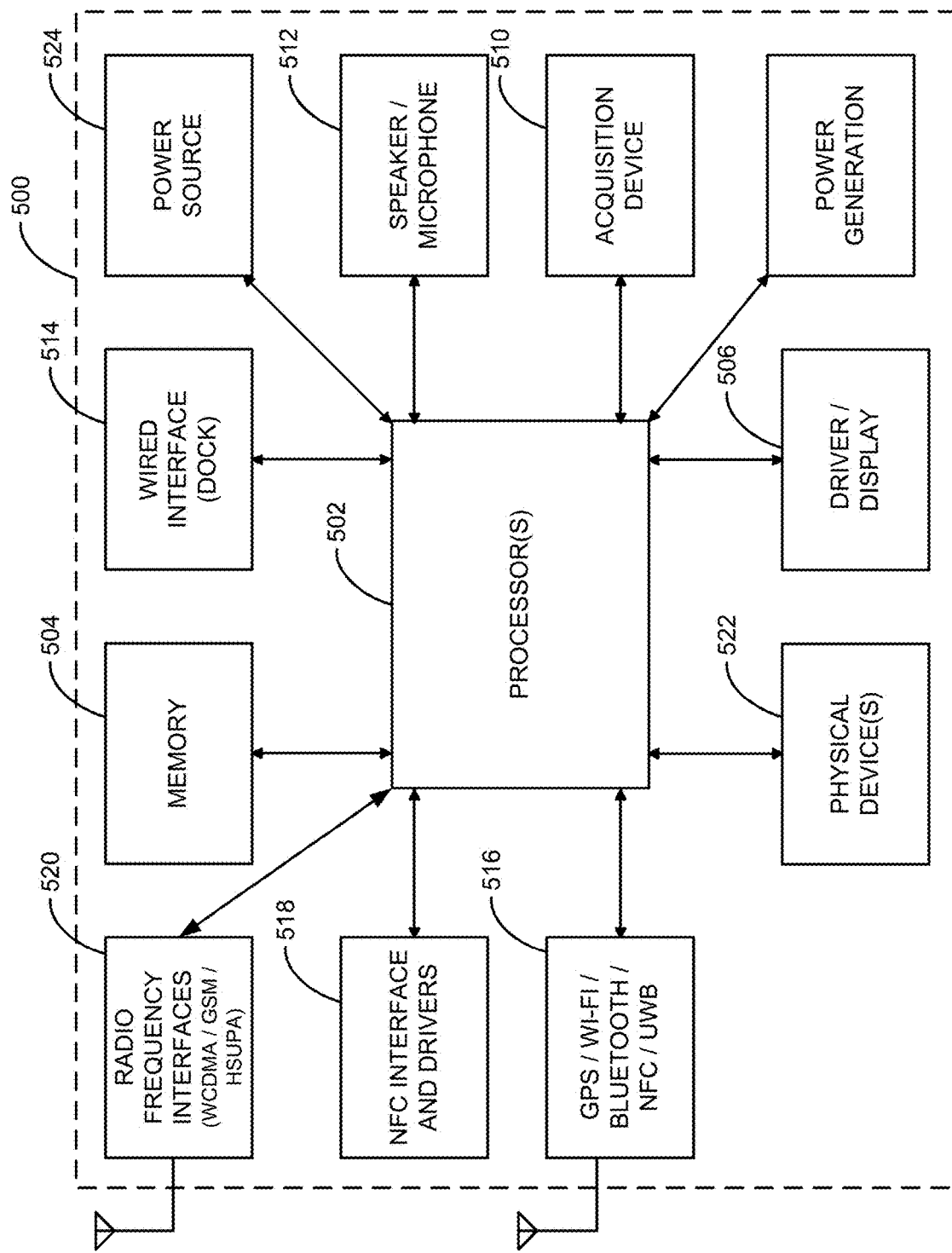
FIG. 5 illustrates a block diagram according to various embodiments.

FIG. 5 illustrates a functional block diagram of various embodiments of the present invention. More specifically, it is contemplated that from user smart devices (e.g. smart wearable devices, smart phones, tablets), to laptops, to cloud-based servers, etc. may be implemented with a subset or superset of the below illustrated components.

In FIG. 5, a computing device 500 may include some, but not necessarily all of the following components: an applications processor 502, memory 504, a display 506, an image acquisition device 510, audio input/output devices 512, and the like. Additional communications from and to computing device 500 can be provided by via a wired interface 514 (e.g. dock, plug, controller interface to peripheral devices); a GPS/Wi-Fi/Bluetooth interface/UWB 516; an NFC interface (e.g. antenna or coil) and driver 518; RF interfaces and drivers 520, and the like. Also included in some embodiments are physical sensors 522 (e.g. (MEMS-based) accelerometers, gyros, magnetometers, pressure sensors, temperature sensors, bioimaging sensors etc.).

In various embodiments, computing device 500 may be a computing device (e.g. Apple ipad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus Rift, HTC Vive, Sony Playstation VR, Magic Leap, Microsoft HoloLens); a wearable device (e.g. Motiv smart ring, smart headphones); an implanted device (e.g. smart medical device), a POS device, a server or the like. Typically, computing device 500 may include one or more processors 502. Such processors 502 may also be termed application processors, and may include a processor core, a video/graphics core, and other cores. Processors 502 may include processor from Apple (A13, A14), NVidia (Tegra), Intel (Core), Qualcomm (Snapdragon), Samsung (Exynos), ARM (Cortex), MIPS technology, a microcontroller, and the like. In some embodiments, processing accelerators may also be included, e.g. an AI accelerator, Google (Tensor processing unit), a GPU, or the like. It is contemplated that other existing and/or later-developed processors/microcontrollers may be used in various embodiments of the present invention.

In various embodiments, memory 504 may include different types of memory (including memory controllers), such as flash memory (e.g. NOR, NAND), SRAM, DDR SDRAM, or the like. Memory 504 may be fixed within computing device 500 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. Additionally, in some embodiments, a secure device including secure memory and/or a secure processor are provided. It is contemplated that other existing and/or later-developed memory and memory technology may be used in various embodiments of the present invention.

In various embodiments, display 506 may be based upon a variety of later-developed or current display technology, including LED or OLED status lights; touch screen technology (e.g. resistive displays, capacitive displays, optical sensor displays, electromagnetic resonance, or the like); and the like. Additionally, display 506 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 506 may integrated into computing device 500 or may be separate. In some embodiments, display 506 may be in virtually any size or resolution, such as a 4K resolution display, a microdisplay, one or more individual status or communication lights, e.g. LEDs, or the like.

In some embodiments of the present invention, acquisition device 510 may include one or more sensors, drivers, lenses and the like. The sensors may be visible light, infrared, and/or UV sensitive sensors, ultrasonic sensors, or the like, that are based upon any later-developed or convention sensor technology, such as CMOS, CCD, or the like. In some embodiments of the present invention, image recognition algorithms, image processing algorithms or other software programs for operation upon processor 502, to process the acquired data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In additional embodiments of the present invention, acquisition device 510 may provide user input data in the form of a selfie, biometric data, or the like.

In various embodiments, audio input/output 512 may include conventional microphone(s)/speakers. In various embodiments, voice processing and/or recognition software may be provided to applications processor 502 to enable the user to operate computing device 500 by stating voice commands. In various embodiments of the present invention, audio input 512 may provide user input data in the form of a spoken word or phrase, or the like, as described above. In some embodiments, audio input/output 512 may be integrated into computing device 500 or may be separate.

In various embodiments, wired interface 514 may be used to provide data or instruction transfers between computing device 500 and an external source, such as a computer, a remote server, a POS server, a local security server, a storage network, another computing device 500, a client device, a peripheral device to control (e.g. a security door latch, a turnstile latch, a gate, a status light, etc.), or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 514 may also provide electrical power, or the like to power source 524, or the like. In other embodiments interface 514 may utilize close physical contact of device 500 to a dock for transfer of data, magnetic power, heat energy, light energy, laser energy or the like. Additionally, software that enables communications over such networks is typically provided.

In various embodiments, a wireless interface 516 may also be provided to provide wireless data transfers between computing device 500 and external sources, such as computers, storage networks, headphones, microphones, cameras, or the like. As illustrated in FIG. 5, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like.

GPS receiving capability may also be included in various embodiments of the present invention. As illustrated in FIG. 5, GPS functionality is included as part of wireless interface 516 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces in various embodiments. In various embodiments, RF interfaces 520 may support any future-developed or conventional radio frequency communications protocol, such as CDMA-based protocols (e.g. WCDMA), GSM-based protocols, HSUPA-based protocols, G4, G5, or the like. In some embodiments, various functionality is provided upon a single IC package, for example the Marvel PXA330 processor, and the like. As described above, data transmissions between a smart device and the services may occur via Wi-Fi, a mesh network, 4G, 5G, or the like.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 506 and inputs/or outputs to physical sensors 522 may be processed in parallel processing threads. In other embodiments, such events or outputs may be processed serially, or the like. Inputs and outputs from other functional blocks may also be processed in parallel or serially, in other embodiments of the present invention, such as acquisition device 510 and physical sensors 522.

In some embodiments of the present invention, physical sensors 522 (e.g. MEMS-based) accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like may be provided. The data from such sensors may be used to capture data associated with device 500, and a user of device 500. Such data may include physical motion data, pressure data, orientation data, or the like. Data captured by sensors 522 may be processed by software running upon processor 502 to determine characteristics of the user, e.g. gait, gesture performance data, or the like and used for user authentication purposes. In some embodiments, sensors 522 may also include physical output data, e.g. vibrations, pressures, and the like.

In some embodiments, a power supply 524 may be implemented with a battery (e.g. LiPo), ultracapacitor, or the like, that provides operating electrical power to device 500. In various embodiments, any number of power generation techniques may be utilized to supplement or even replace power supply 524, such as solar power, liquid metal power generation, thermoelectric engines, rf harvesting (e.g. NFC) or the like.

FIG. 5 is representative of components possible for a smart reader, a smart device, an authentication service server, a transaction service server, and the like for embodying different embodiments. It will be readily apparent to one of ordinary skill in the art that many other hardware and software configurations are suitable for use with the present invention. Embodiments of the present invention may include at least some but need not include all of the functional blocks illustrated in FIG. 5. For example, a smart phone (e.g. access control device) configured to perform may of the functions described above includes most if not all of the illustrated functionality. As another example, a wearable device, e.g. a smart ring (electronic devices enclosed in a ring-shaped shell, enclosure, or form factor), may include some of the functional blocks in FIG. 5, but it need not include a high-resolution display 530 or a touch screen, a speaker/microphone 560, wired interfaces 570, or the like. In still other examples, a cloud-based server or a virtual machine (VM) may not include image acquisition device 512, MEMs devices 522, GPS capability 516, and the like, further components described above may be distributed among multiple computers, virtual machines, or the like.

Further embodiments can be envisioned to one of ordinary skill in the art after reading this disclosure. For example, in some embodiments, a wearable smart device may be a ring, a smart watch, a fitness tracker, smart glasses, smart earbuds or earphones, a smart earing, a patch worn on the skin, and the like. Additionally, the computing device (e.g. smart device) interacting with the wearable device may be a smart tablet, a smart phone, a computer, a control access system, and the like. In some embodiments, for authentication purposes, transaction service may record transactions using a block-chain technology for evidentiary purposes. Further, the cloud-based authentication service may provide service for one organization or multiple organizations and may be implemented as virtual machines, and the like. Additionally, different methods for providing user authentication, application software, transactions, or the like are contemplated. As merely examples: Web3 functionality such as distributed/decentralized identity for self-sovereign identification, distributed applications for providing application functionality to smart devices, decentralized autonomous organization for authenticating transactions, block-chain/wallets for recording and providing access to digital assets, and the like.

Embodiments of the present invention may also be applied to theme parks. In one example, guests at a park may interact with characters, e.g. Snow White, Snoopy, etc. In such cases, the character may wear a smart ring a tag, or the like that may be sensed by the smart phone of the guest. As discussed above, in response, the smart phone may receive the advertisement data pointing to certain metadata and ask the guest whether they want to load the application, in real-time. If the guest does, the metadata and the application may present a user interface to the guest's phone. The user interface may allow the guest to receive one or more souvenirs, such as: a digitally signed token or souvenir (incorporating the user's phone number, name, or the like); the ability to take a selfie with the character that is specially framed or that is digitally signed, or the like; the ability to download a special audio, video, application program or other media; the ability to obtain a "head of the line" ride ticket; the ability to receive a digital coupon (discount or free) for a physical object (e.g. a stuffed animal); the ability to receive a special item or power-up in a video game; the ability to receive a limited-time membership in an on-line service; the ability to receive a non-fungible token; the ability to enter a controlled access region (e.g. facilitating or causing a physical gate, door or turnstile, or the like to unlatch or open, thereby allowing the smart phone user to enter); and the like. In some embodiments, the guests may select one or all of these actions by making a selection of the graphical user interface provided in the application discussed above. In light of the current patent disclosure, one of ordinary skill in the art will recognize other criteria that can be incorporated into alternative embodiments of the present invention.

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method for authentication, comprising:
   registering, in an authentication service, a first identifier associated with a wearable device associated with a first user, wherein the authentication service is associated with an interface application;
   disposing the wearable device proximate to a smart device associated with a second user that does not have the interface application installed, wherein the wearable device provides a second identifier associated with the interface application, and wherein the smart device stores a document or a reference to a document;
   receiving, in the authentication service, a communication from the smart device facilitated by the interface application, wherein the smart device receives the interface application in response to the second identifier, wherein the communication comprises the first identifier and the document or the reference to the document;
   determining, in the authentication service, whether the authentication service is approved for the document in response to the first identifier associated with the wearable device;
   digitally signing, in the authentication service, the document to form a digitally signed document, in response to the document and to determining that the authentication service is approved; and
   outputting, with the authentication service, the digitally signed document or a reference to the digitally signed document to the smart device.

2. The method of claim 1, wherein the wearable device is selected from a group consisting of a finger-worn device, a wrist-worn device, a sub-cutaneous device, and a faceworn device.

3. The method of claim 1, wherein the second identifier is disposed upon a surface of the wearable device.

4. The method of claim 1, wherein the first identifier is wirelessly provided from the wearable device.

5. The method of claim 1,
   wherein registering in the authentication service further comprises providing to the authentication service a registered password associated with the wearable device;
   wherein receiving in the authentication service, the communication from the smart device using the interface application, comprises: receiving in the authentication service, the communication and a submitted password from the smart device facilitated by the interface application, wherein the smart device receives the interface application in response to the second identifier, and wherein the communication comprises the first identifier, the submitted password and the document or the reference to the document; and
   wherein determining whether the authentication service is approved is in response to the first identifier, the submitted password, and the registered password.

6. The method of claim 1, further comprising:
   receiving in the authentication service, the document, in response to the reference to the document, wherein the reference comprises a document stored on a network storage device.

7. The method of claim 1:
   wherein the reference to the digitally signed document comprises a registered storage location; and
   wherein the method further comprises:
      providing from the authentication service, the digitally signed document for storage in the registered storage location; providing with the authentication service, the registered storage location to the smart device; and
      wherein the registered storage location is selected from a group consisting of: a blockchain address, a cloud-storage, and a third-party service.

8. The method of claim 1, wherein the document comprises data selected from a group consisting of:
   an image, a video, a telephone number associated with the smart device, an email associated with the smart device, a document including text, and a .pdf document.

9. The method of claim 1,
   wherein the wearable device provides the second identifier associated the interface application and a third identifier associated with metadata; and
   wherein the smart device receives the interface application in response to the second identifier, wherein the smart device receives the metadata in response to the third identifier, wherein the communication comprises the first identifier and the document.

10. The method of claim 1, further comprising:
    disposing the wearable device proximate to a second smart device that has the interface application installed, wherein the wearable device provides the second identifier associated the interface application, and wherein the second smart device stores a second document or a reference to the second document;
    receiving in the authentication service, another communication from the second smart device facilitated by the interface application, wherein the communication comprises the first identifier and the second document or the reference to the second document;
    determining in the authentication service, whether the authentication service is approved for the second document in response to the first identifier;
    digitally signing in the authentication service, the second document to form a second digitally signed document, in response to the second document and to determining that the authentication service is approved; and
    outputting with the authentication service, the second digitally signed document or the reference to the second digitally signed document to the second smart device.

11. A method, comprising:
    registering, in an authentication service, a first identifier associated with a wearable device associated with a first user, wherein the authentication service is associated with an interface application;
    disposing the wearable device proximate to a smart device associated with a second user that does not have the interface application installed, wherein the wearable device provides a second identifier associated the interface application to the smart device;
    receiving in the authentication service, a communication from the smart device facilitated by the interface application, wherein the smart device receives the interface application in response to the second identifier, and wherein the communication comprises the first identifier and a third identifier associated with the smart device;

determining in the authentication service, whether the authentication service is approved in response to the first identifier associated with the wearable device;

determining in the authentication service, a digital asset in response to the third identifier and to determining that the authentication service is approved; and outputting with the authentication service, the digital asset or a reference to the digital asset to the smart device.

12. The method of claim 11, wherein the wearable device is selected from a group consisting of a finger-worn device, a wrist-worn device, a sub-cutaneous device, headworn device.

13. The method of claim 11, wherein the second identifier is disposed upon a surface of the wearable device.

14. The method of claim 11, wherein the first identifier is wirelessly output from the wearable device.

15. The method of claim 11, wherein registering in the authentication service comprises:

registering, in the authentication service, a first digital asset, wherein determining the digital asset in response to the third identifier comprises digitally signing in the authentication service, the third identifier associated with the smart device and the first digital asset to form a digitally signed document, in response to the third identifier, to the first digital asset and to determining that the authentication service is approved.

16. The method of claim 11, wherein the digital asset comprises a photograph, a video, a document including text, audio.

17. The method of claim 11, further comprising:

storing in the authentication service, the digital asset in a registered location;

wherein outputting with the authentication service, the reference to the digital asset to the smart device comprises providing with the authentication service, the registered location to the smart device; and wherein the registered location is selected from a group consisting of: a blockchain address, a storage service, a cloud storage, and a third-party service.

18. The method of claim 11, wherein the third identifier is selected from a group consisting of a telephone number associated with the smart device, an email associated with the smart device, a document including text, and a .pdf document.

19. The method of claim 11, wherein determining in the authentication service, the digital asset also comprises determining a customized digital asset in response to the third identifier; and wherein the digital asset is selected from a group consisting of: a digital souvenir, a digitally signed token, an augmented photograph, an audio or video message, a digital asset in a software application, a membership in an on-line service, and a grant of priority services.

20. The method of claim 11, further comprising:

disposing the wearable device proximate to a second smart device that has the interface application installed;

receiving in the authentication service, a second communication from the second smart device facilitated by the interface application, wherein the second communication comprises the first identifier and a fourth identifier associated with the second smart device;

determining in the authentication service, whether the authentication service is approved in response to the first identifier;

determining in the authentication service, a second digital asset in response to the fourth identifier and to determining that the authentication service is approved; and outputting with the authentication service, the second digital asset or a location of the second digital asset to the second smart device.

\* \* \* \* \*